April 20, 1943.  R. W. JOHNSON  2,317,063
CONVERSION OIL CONTROL DEVICE
Filed April 4, 1940  4 Sheets-Sheet 1
Fig. 2.
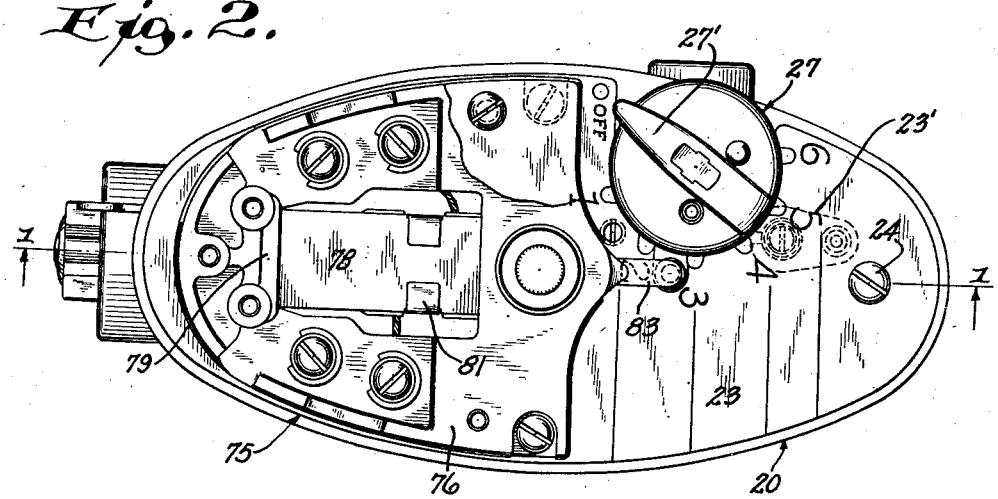
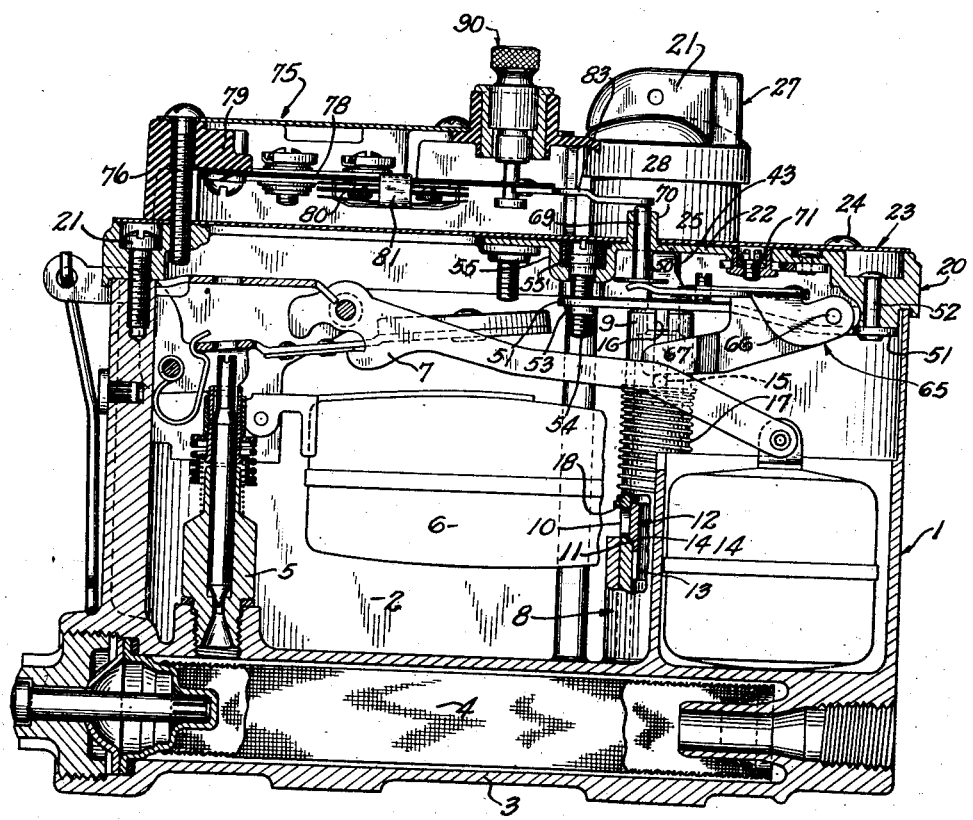
Fig. 1.
INVENTOR
ROY. W. JOHNSON.
BY John W. Michael
ATTORNEY April 20, 1943.   R. W. JOHNSON   2,317,063
CONVERSION OIL CONTROL DEVICE
Filed April 4, 1940   4 Sheets-Sheet 2
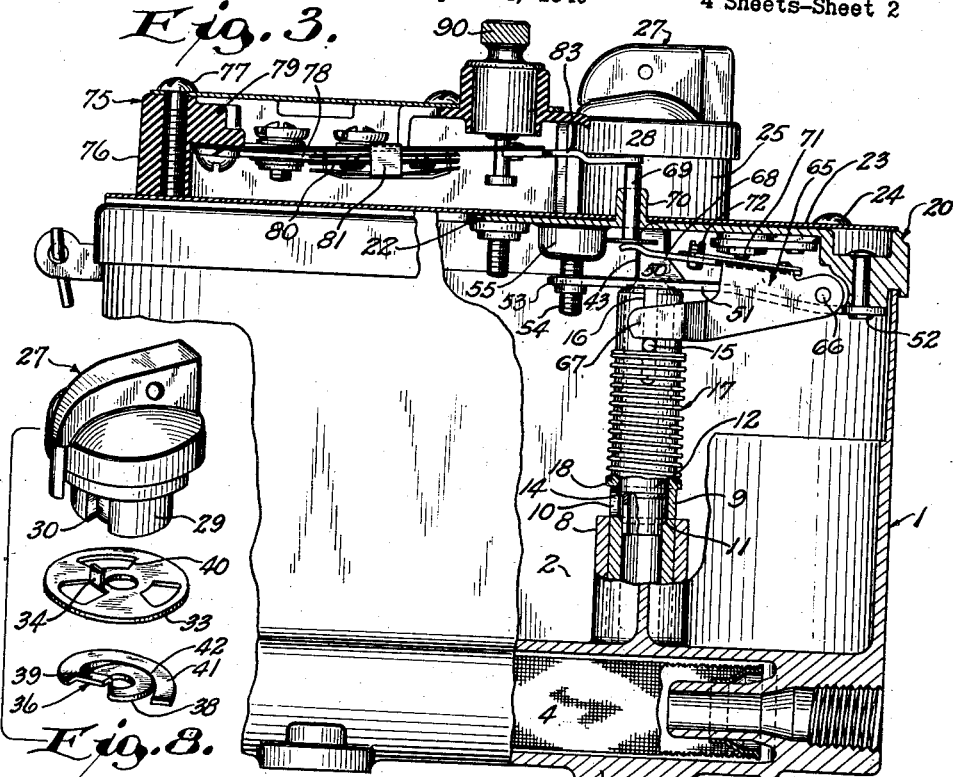
Fig. 3.
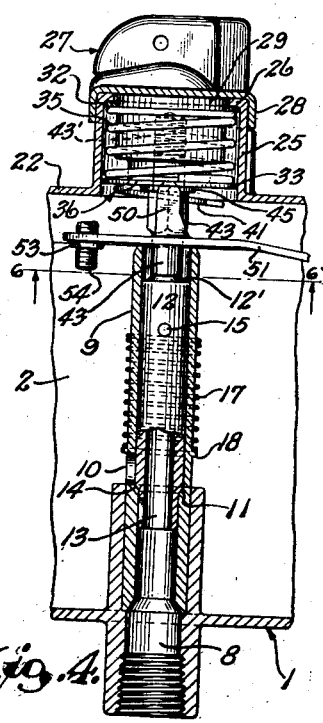
Fig. 4.
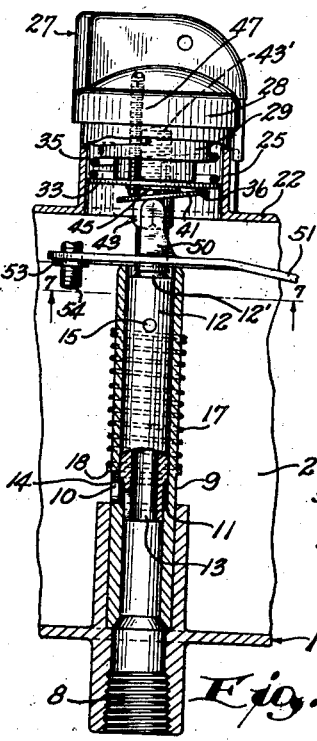
Fig. 5.
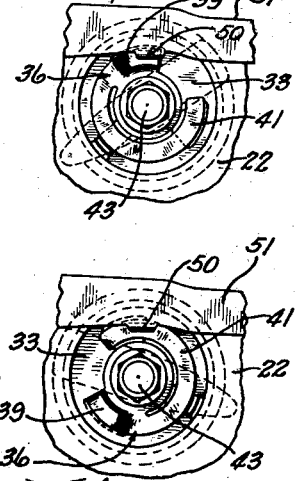
Fig. 6.
Fig. 7.
Fig. 8.
INVENTOR
ROY W. JOHNSON
BY John W. Michael
ATTORNEY April 20, 1943.　　　　R. W. JOHNSON　　　　2,317,063
CONVERSION OIL CONTROL DEVICE
Filed April 4, 1940　　　　4 Sheets-Sheet 3
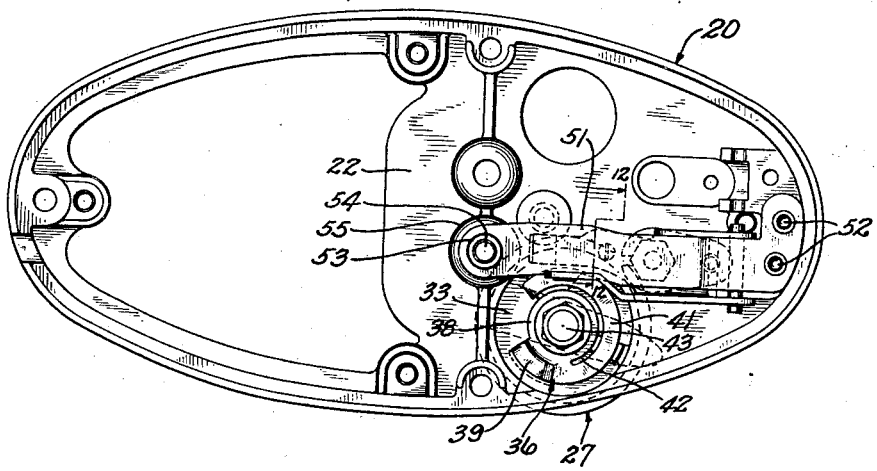
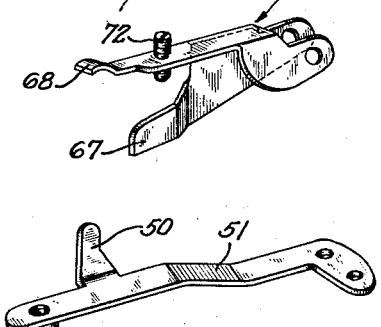
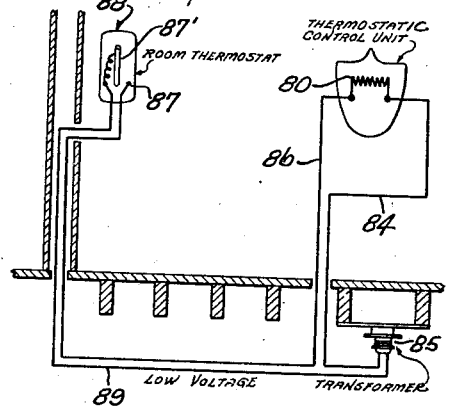
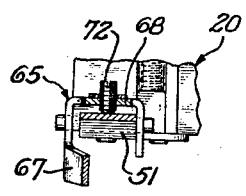
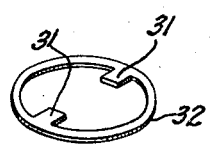
INVENTOR
ROY. W. JOHNSON.
BY John W. Michael
ATTORNEY April 20, 1943.  R. W. JOHNSON  2,317,063
CONVERSION OIL CONTROL DEVICE
Filed April 4, 1940  4 Sheets-Sheet 4
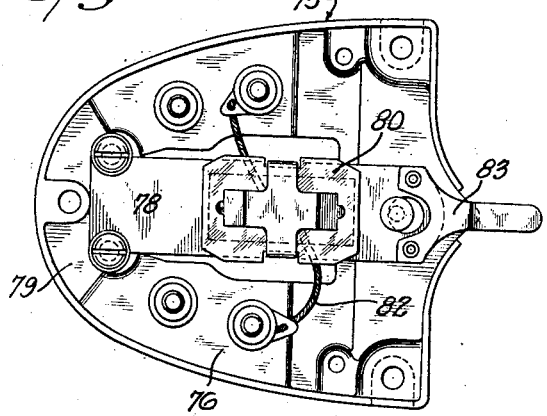
Fig. 14.
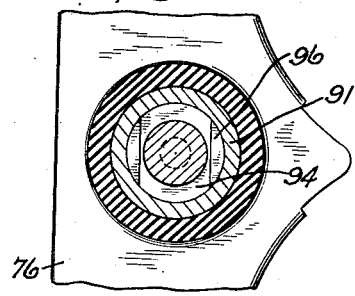
Fig. 16.
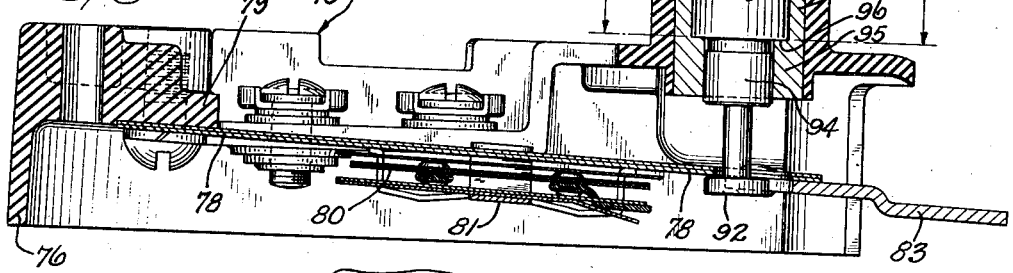
Fig. 15.
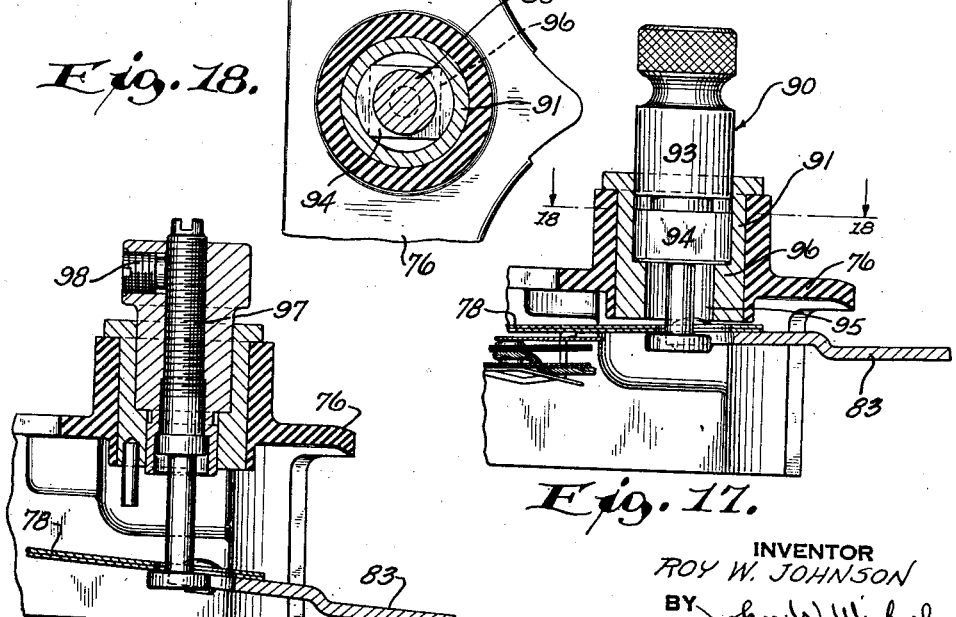
Fig. 18.
Fig. 17.
Fig. 19.
INVENTOR
ROY W. JOHNSON
BY John W. Michael
ATTORNEYS.

Patented Apr. 20, 1943

2,317,063

UNITED STATES PATENT OFFICE 2,317,063

CONVERSION OIL CONTROL DEVICE

Roy W. Johnson, Milwaukee, Wis.

Application April 4, 1940, Serial No. 327,789

8 Claims. (Cl. 137—21)

This invention relates generally to a constant level oil control device for regulating the supply of oil or liquid fuel to a gravity-fed burner, and is adapted to be conveniently embodied in a manually or thermostatically controlled type of device.

One of the objects of the invention is to provide a constant level oil control of this character, which is so constructed and organized as to be quickly and conveniently adjusted to compensate for the varying grades of fuel oils available in various parts of the country. The adjustment is easily accessible and automatically takes care of the low and high fire settings in one operation, and provides an adequate range of adjustment to compensate for the variations in oil flows that are consequent to variations in the grades of fuel oils.

Another object of the invention is to provide an oil control device of this character, which may be readily and easily converted from manual to thermostatic operations.

A further object of the invention is to provide a thermostatic control of such character that in case of current failure the metering valve is automatically moved to pilot or low fire position and yet by raising the manually operable control plunger associated with the thermostatic control the device can be restored to the full control of the manual control means.

A still further object of the invention is to provide a manual control for a constant level device of this character which incorporates a compactly and closely organized yet simple, durable, and efficient cam means for manually setting the metering valve.

Another object of the invention is to provide a device of this character, which is, in general, simple and durable in its construction, reliable and efficient in operation, and easy and inexpensive to manufacture and install.

Other objects and advantages reside in certain novel features of the construction, arrangement, and combination of parts, which will be hereinafter more fully described and particularly pointed out in the appended claims, reference being had to the accompanying drawings forming a part of this specification, and in which:

Figure 1 is a view in longitudinal, vertical cross section, taken on line 1—1 of Figure 2, and showing a constant level oil control device embodying the present invention equipped with both manual and thermostatic control means, the metering valve of the device being illustrated in fully closed position;

Figure 2 is a view in top plan of the device shown in Figure 1 with the nameplate of the thermostatic control unit broken away for the sake of illustration;

Figure 3 is a view partly in side elevation and partly in longitudinal, vertical section, taken on line 1—1 of Figure 2, but showing the metering valve in full, open position;

Figures 4 and 5 are fragmentary views in vertical cross section illustrating the manually operable means for regulating the position of the metering valve and showing the fully closed and fully opened positions, respectively, of the metering valve;

Figures 6 and 7 are fragmentary views in horizontal section, taken on lines 6—6 and 7—7 of Figures 4 and 5, respectively, to further illustrate the construction of the cam which effects the manual setting of the metering valve;

Figure 8 is a group view in perspective of the control knob, combination driving and abutment plate, and hardened steel cam employed for effecting adjustment of the metering valve;

Figure 9 is a view in bottom plan of the cover frame and parts carried thereby, the nameplate of the cover frame and the thermostatic control unit which may be combined therewith being omitted from the illustration;

Figure 10 is a detail perspective view of the valve-operating lever interposed between the thermostatic control unit and the metering valve;

Figure 11 is a detailed perspective view of the adjustable supporting arm for the cam abutment lug of the manually operable adjusting means for the metering valve;

Figure 12 is a fragmentary detailed view in vertical cross section, taken on line 12—12 of Figure 9;

Figure 13 is a detail perspective view of the antifriction washer against which one end of the spring of the manually operable rotary cam means abuts;

Figure 14 is a view in bottom plan of the thermostatically controlled unit detached from the control device, the unit being illustrated on a smaller scale.

Figure 15 is a view thereof in central, vertical, longitudinal cross section of the thermostatically controlled unit and illustrating one position of the manual control plunger of the thermostatic control unit;

Figure 16 is a detail view in horizontal cross section taken on line 16—16 of Figure 15;

Figure 17 is a fragmentary view in cross section similar to Figure 15 but showing another position of the manually operable plunger of the thermostatic control unit;

Figure 18 is a view in horizontal cross section taken on line 18—18 of Figure 17;

Figure 19 is a fragmentary view in central, longitudinal, vertical cross section, showing a modified construction of the manually operable control plunger of the thermostatically controlled unit; and Figure 20 is a diagrammatic view of a circular arrangement or system in which the thermostatically controlled unit of the present invention may be embodied.

Referring to the drawings, and more particularly to Figures 1 to 3, it will be seen that the control device embodying the present invention comprises a casing, designated generally at 1, and having a main liquid supply chamber 2 therein. Liquid fuel is supplied through an inlet 3 equipped with a strainer 4 to an inlet valve 5 controlled by main float 6 so that a constant level of liquid fuel is maintained in the supply chamber 2. A safety shut-off mechanism, designated generally at 7, is combined with the means for maintaining the level of liquid fuel in the main supply chamber 2 in the manner fully described and claimed in my Patents 2,068,138, granted January 19, 1937, and 2,120,364, granted June 14, 1938.

The liquid flows out of the main supply chamber 2 through one or more outlet passages 8 (see Figures 4 and 5) which are connected up to the burner (not shown). As the outlet passages and their associated valve mechanism are identical, a description and illustration of but one will serve.

A tubular valve guide 9 has its lower end press fitted, or otherwise suitably secured, in the upper portion of the outlet passage 8, the valve guide extending vertically in the casing and terminating a short distance below the upper end of the casing. The tubular valve guide 9 is provided with a lateral opening or port 10 which provides for communication between the interior of the valve guide and the liquid supply chamber 2. Just below this port the tubular valve guide has an internal valve seat 11. A metering valve 12 is slidably fitted in the tubular valve guide 9 for vertical movement and has its lower end 13 reduced and slotted and designed to coact with the valve seat 11 and with the internally restricted lower end of the valve guide 9 to meter the flow of oil from the liquid supply chamber to the outlet passage. The metering valve also has a beveled portion 14, which snugly engages the bevel valve seat 11 of the valve guide in the fully closed position of the metering valve. The metering valve 12 is constrained to vertical sliding movement, and is held against rotation by means of a transverse guide pin 15 which extends through openings provided therefor in the metering valve, and projects through and laterally beyond vertical slots 16 provided therefor in the upper portion of the valve guide 9.

Means is provided for biasing the metering valve 12 to open position, and may conveniently take the form of an expansible coil spring 17 having its lower end engaging an abutment 18 provided therefor on the valve guide and having its upper end engaging the under sides of the projecting ends of the guide pin 15.

Applied to the upper open end of the casing 1 is a cover frame, designated generally at 20. The marginal portion of the frame 20 is releasably secured to the body of the casing 1 by a suitable number of screws 21. The portion of the cover frame 20 that overlies the metering valve has a transversely extending and horizontally disposed web 22 cast integrally therewith and formed with suitable openings to accommodate the various elements to be hereinafter described. The closure of the top of the control device is completed by the provision of a nameplate 23, which is releasably secured in position by a suitable number of screws 24.

The portion of the web 22 of the cover frame, which directly overlies the metering valve 12, is provided with an integral upstanding sleeve 25 formed at its upper end with an inturned annular flange 26 (see Figure 4). The manually operable control knob for the metering valve, designated generally at 27, is rotatably interfitted with the upper end of this sleeve 25, and for this purpose has a depending annular flange 28 which rotatably fits over the upper end portion of the sleeve 25. The knob 27 has an integral, reduced central or body portion 29 which extends down into the sleeve 25. This central portion 29 of the knob has diametrically opposite key slots 30 extending longitudinally thereof. The slots 30 slidably interfit with inwardly directed keys or lugs 31 formed on a washer 32 which is slipped up over the central portion of the knob and abuts the under face of the flange 26 of the sleeve 25 in the assembly (see Figure 4 and 13). The lower end of the central portion 29 of the knob 27 presents a flat face or seat against which the central portion of a combined driving plate and spring abutment plate, designated generally at 33, engages. The plate 33 is rotatably coupled to the knob 27 so as to be constrained to turn therewith, and for this purpose it may have a driving lug 34 struck therefrom and interengaged with one of the key slots 30 of the central portion 29 of the knob 27. A coil spring 35 encircles the reduced central portion 29 of the knob 27 and its upper end abuts the anti-friction washer 32, which in turn abuts the inturned flange 26 of the stationary sleeve 25. The lower end of the spring 35 abuts the plate 33, and since in the assembly the plate 33 is held against axial movement relative to the central portion of the knob, the spring 35 forces the entire knob assembly downwardly relative to the sleeve 25. A cam, designated generally at 36, is placed up against the under side of the plate 33. The cam 36 has an apertured hub portion 38 which engages the central portion of the plate 33 and has an upwardly offset portion 39 which serves two functions, namely as a part of the active face of the cam 36, and also as a means for establishing a positive driving connection between the plate 33 and the cam 36. In carrying out the latter purpose, the offset portion 39 of the cam is in the assembly interfitted with a slot 40 provided in the plate 33. Circumferentially alined with the offset portion 39 is an adjustable cam strip 41, the strip portion 41 being given its formation and rendered capable of flexure to vary throw of the cam by virtue of the provision of a slot 42 between the strip 41 and the hub portion 38 of the cam. The slot 42 terminates in slightly spaced circumferential relation to the offset portion 39 of the cam 36. The cam 36 is of hardened steel so as to be capable of taking the wear, but is sufficiently flexible or resilient to be capable of the adjustment desired.

The cam 36 and the plate 33 are both securely held against the lower end of the central portion 29 of the knob 27 by means of a headed stud 43 which has a reduced and threaded shank 43' threadedly interfitted with an internally threaded opening provided in the central portion 29 of the knob 27 and opening through the lower end thereof. A lock washer 45 is interposed between the shoulder presented at the juncture of the head of the stud 43 and its shank 43' so as to retain the parts against accidental displacement after they have been assembled. The stud 43 thus effectively secures the cam and plate 33 in position, and it serves the further purpose of a metering valve operator in that it directly engages a boss 12' provided on the upper end of the metering valve 12, and thereby transmits motion from the knob 27 to the metering valve in a manner which will hereinafter more clearly appear. The throw of the cam 36 is varied by flexing the strip 41, and this may be conveniently effected by providing an adjusting screw 47 which is threaded through the knob 27 and has its lower rounded end bearing down on a portion of the strip 41. The upper end of the adjusting screw 47 is cross slotted and is accessible through a hold in the upper end of the knob. The details of the construction of the cam per se form no part of the present invention and are more fully disclosed in U. S. Patent No. 2,244,161, issued June 3, 1941, to Roy W. Johnson.

In the assembly the active face of the cam 36 rides on an abutment lug 50 which may be integrally formed with an adjustable supporting arm 51. By supporting the lug 50 on the adjustable arm 51, it is practical and convenient to compensate for variations in grades of fuel oil. In the present instance this compensation is had by constituting the arm 51 of stiffly resilient metal and riveting one end of it, as at 52, to the cover frame 20. The opposite end of the arm is formed with a threaded bearing 53. An adjusting screw 54, which has a swivel connection 55' with a socket 55 provided thereof in web 22, is threadedly interengaged with the bearing 53. The top of the screw 55 is cross slotted, and when the cover plate is removed is accessible for adjustment. By turning the screw 54 the arm 51 is flexed upwardly or downwardly depending upon the direction in which the screw 55 is turned, thereby raising or lowering the abutment lug 50.

With this construction, by turning the knob 27 the cam 36 will ride along the rounded upper end of its abutment lug 50, and consequently the knob assembly, including stud 43, will be shifted up or down depending upon the direction in which it is turned.

The vertical movement of the stud 43 effects a corresponding movement in the metering valve, in that it allows it to open or moves it toward closed position as the case may be. Figures 5 and 7 show the fully open position of the valve 12 in which position the portion of the cam strip 41 deflected down farthest is engaged with the cam abutment lug 50. Consequently, the entire knob assembly is elevated as high as it may be, the stud 43 is elevated as far as possible, and valve 12 is fully opened. Figures 4 and 6 illustrate the full shut-off position of the valve 12 wherein the upper end of the cam abutment lug 50 is engaged with the upwardly offset portion 39 of the cam 36 to permit the cam 36 and entire knob assembly to lower as far as they may whereby stud 43 pushes the metering valve 12 to fully closed position against the action of its biasing spring 17.

In order to adapt a manually controlled device of this character to thermostatic control, it is proposed to equip all units at the factory with an auxiliary valve-operating mechanism with which a thermostatic control may be readily combined. This auxiliary valve-operating mechanism comprises a valve-operating lever, designated generally at 65, and having one end pivotally mounted or fulcrumed, as at 66, within the casing 1. An arm 67 of the lever is engageable with the guide pin 15 of the metering valve 12 to control the position of the metering valve when the device is converted to a thermostatically controlled unit. The valve-operating lever 65 also has a second lever arm 68 which may be integral therewith, and which is preferably horizontally disposed. In fact, as shown in the drawings, the valve-operating lever 65 is preferably constituted of a sheet metal stamping. The outer end of the arm 68 of the lever 65 engages the lower headed end of an operating pin 69 which is slidably fitted in a bearing 70 provided therefor in the web 22 of the casing. In order to control the high and low fire positions of a valve when it is subject to the thermostatic control, high and low fire stops for lever 65 are provided, the high fire stop being in the form of an adjustable screw 71 carried by the web 22 and engageable with the lever arm 68 to limit the upward swing of the other valve-operating lever 65. The low fire stop may comprise an adjustable screw 72 threadedly interconnected with the arm 68 of the lever 65, and engageable with the supporting arm 51 to limit the downward swinging movement of the valve-operating lever 65.

A thermostatically controlled unit, which may be combined with the instrumentalities hereinabove described, is designated generally at 75 and comprises a flat casing 76 which may preferably be constituted of molded material, such as "Bakelite," or the like. When this unit 75 is combined with the control device, it is only necessary to remove three of the nameplate screws 21, and place the unit 75 in position and then secure it by means of longer screws 77. A bimetallic leaf 78 is provided in the casing 75, and has one end securely fastened to bearing pad 79 provided therefor in the casing. The opposite end of this bimetallic leaf has an operating tongue 82 attached thereto and overlying and operatively engaged with the upper end of the valve-operating pin 69. An electric heating element 80 is secured or attached to the leaf 78 by means of a clip 81, but is electrically insulated therefrom. The electric heating element has one terminal connected by means of a conductor 84 to the secondary of the step down transformer 85. The other terminal of this heating element is connected by the conductor 86 with the so-called "red" contact 87 of the room thermostat designated at 88. The bimetallic element 87' of the room thermostat 88 is connected by means of a conductor 89 to the other terminal of the transformer 85. Of course, the electrical system, as illustrated in Figure 18, is intended to be illustrative only, and any suitable or well-known type of electrical circuit adapted to this character of device may be employed.

With the thermostatic control unit 75 in place, and the manual control knob 27 adjusted to any, except shut-off, position, the thermostatic unit 75 will take over control and regulate the valve 12 between the low fire position and the high fire position as determined by control of knob 27. The knob 27 may be designed to provide a pointer 27' which coacts with the dial 23' provided on the main plate to facilitate accurate adjustment of the device. If the room thermostat 88 calls for heat its contacts 87' and 87 will be engaged and the circuit through the electric heating element 80 will be closed. Thereupon the bimetallic leaf 78 will become heated and will flex upwardly, thereby moving the tongue 83 up away from the pin 69 and allowing the valve spring 17 to swing the lever 65 upwardly and permit the metering valve 12 to open under the influence of its spring 17. When the room thermostat is satisfied its contacts 87' and 87 are disengaged and the supply of current to the heating element 80 is shut off. Consequently, the bimetallic leaf 78 cools down and its tongue 83 presses downwardly on the pin 69, thereby swinging the valve-operating lever 65 in a counter-clockwise direction, as viewed in Figures 1 and 3, whereupon its arm 67 will press on pin 15 and move the metering valve 12 towards closed position.

It will be obvious from the foregoing that a thermostatic control unit is of such character that in the event of current failure the metering valve 12 will be automatically moved to pilot or low fire position. In order that heat may be available under the regulation of the manual control, under such circumstances, a manually operable control plunger 90 is combined with the thermostatically controlled unit. This plunger 90 has a rotating and sliding fit in the bearing 91 provided therefor on the casing 75, and its lower headed end is swively interconnected with the bimetallic leaf 78. The upper portion 93 of the plunger is cylindrical and has a rotating and sliding fit in a correspondingly formed portion of the bearing 91. The lower portion 94 of the plunger is of non-circular cross section, and is slidably but non-rotatably fitted in a correspondingly formed lower portion 95 of the bearing 91. The bearing 91 is provided with a shoulder 96 intermediate its cylindrical and non-circular portions. With this construction, when the plunger 90 is in its lowermost position, the bimetallic element is entirely free of its control. However, by pulling upwardly on the plunger 90 its head 92 will engage the free end of the bimetallic leaf 78 and warp it upwardly against the influence of its inherent tension. When the non-circular portion 94 of the plunger is positioned above the shoulder 96, then the plunger may be turned to cause the non-circular portion to interlock with the shoulder and retain the plunger raised. This restores the device to manual control.

Figure 19 illustrates a modification of the construction of the manual control plunger of the thermostatic control unit in that instead of having the head 92 and its shank as an integral rigid part of the plunger proper, it is made separate and threadedly interconnected therewith, as at 97. This permits of an adjustment of the effective length of the plunger, and consequently permits of a pilot selection or a selection of an intermediate fire. A lock screw 98 is provided to releasably maintain the parts in any selected adjustment.

While I have shown and described several constructions in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

I claim:

1. An oil control device of the character described comprising a casing having a liquid supply chamber provided with an outlet, a metering valve for regulating flow through said outlet, means for biasing said metering valve toward open position with a predetermined force, a manually operable control knob axially and rotatively mounted on the casing in operative relationship to the valve, a rotary cam fixed to said knob, a spring interposed between said casing and said cam and urging said cam and knob toward said valve with a force greater than said predetermined force, an abutment for said cam, a supporting arm for said abutment mounted within the casing, and a valve operator connected to the knob and abutting with the valve to move said valve toward closed position as said knob and cam are moved axially upon being rotated.

2. An oil control device of the character described comprising a casing having a liquid supply chamber provided with an outlet, a metering valve for regulating flow through the outlet, means for biasing the valve toward open position with a predetermined force, a manually operable control knob for said valve mounted on the casing in operative relationship to the valve and for axial shifting movement, a combined abutment and driving plate fixed to the lower end of the knob, a spring interposed between the casing and said plate for biasing the knob toward said valve with a force greater than said predetermined force, a cam fixed to said plate and knob so as to be constrained to rotate and move axially with the knob, an abutment lug mounted on the casing and engaged with the cam, and a valve operator connected to the knob and controlled as to position thereby and abutting with the valve whereby the valve will assume a position with respect to its seat depending on the position to which the knob is rotated.

3. An oil control device of the character described comprising a casing having a liquid supply chamber provided with an outlet, a metering valve for regulating flow through the outlet, means for biasing the metering valve to open position with a predetermined force, a manually operable control knob mounted on the top of the casing for rotary and axial shifting movement, a combined abutment and driving plate fixed to the lower end of the knob, a cam disk having a hub portion fixed to the knob and having an offset peripheral portion rotatively coupled to said plate, said cam disk also having a flexible peripheral cam strip in circumferential alinement with said offset peripheral portion, a screw mounted on the knob and engageable with the strip to vary the throw of the cam, a spring exerting a greater force than said predetermined force interposed between the casing and the top of the combined abutment and driving plate to urge the cam plate and disk downwardly, an abutment lug supported in the casing and engageable with the strip and offset portion of the cam depending upon the angular adjustment of the disk, and a valve operator connected to the knob and cooperable with the valve to control the position thereof.

4. An oil control device of the character described comprising a casing having a liquid supply chamber provided with an outlet, a metering valve for regulating flow through the outlet, means for biasing the valve to open position with a predetermined force, a manually operable control knob mounted on the casing for rotary and vertical shifting movement and overlying the valve, a combined abutment and driving plate engaged with the lower end of the knob, a cam disk engaged with the under side of the plate and interfitted therewith, a stud threadedly connected with the knob and having a shoulder engaged with the cam disk to secure the disk and the plate to the knob and also engageable with the upper end of the valve, an abutment lug mounted on the casing and engaged with the cam, and a spring exerting a greater force than said predetermined force interposed between the casing and said plate to cause the cam disk to press against the lug.

5. A control device of the character described comprising a casing having a liquid supply chamber provided with an outlet, a metering valve for regulating flow through said outlet, spring means for biasing the valve toward open position with a predetermined force, a rotatably and axially movable cam having means abutting with the valve whereby the valve will assume a position with respect to its seat depending on the position to which said cam is rotated, a spring associated with said cam and urging said cam toward said valve with a force greater than said predetermined force, an adjustable abutment lug slidably engaged with said cam to vary its axial movement upon rotation thereof, a valve-operating lever pivotally supported in said casing and having an arm also abutting with said valve, and a bimetallic leaf and electric heating element on said casing and cooperable with said lever to move said valve toward closed position from open position as determined by the setting of said cam.

6. A control device of the character described comprising a casing having a liquid supply chamber provided with an outlet, a metering valve for regulating flow through said outlet, spring means for biasing the valve toward open position with a predetermined force, a rotatably and axially movable cam having means abutting with the valve whereby the valve will assume a position with respect to its seat depending on the position to which said cam is rotated, a spring associated with said cam and urging said cam toward said valve with a force greater than said predetermined force, an adjustable abutment lug slidably engaged with said cam to vary its axial movement upon rotation thereof, a supporting arm for said lug, a valve-operating lever pivotally supported in the casing and having an arm abutting with said valve and a second arm overlying said supporting arm, and a thermally operated element on the casing and cooperable with said second arm to move said valve toward closed position from the open position as determined by the setting of said cam.

7. A control device of the character described comprising a casing having a liquid supply chamber provided with an outlet, a metering valve for regulating flow through said outlet, spring means for biasing the valve toward open position with a predetermined force, a rotatably and axially movable cam having means abutting with the valve whereby the valve will assume a position with respect to its seat depending on the position to which said cam is rotated, a spring associated with said cam and urging said cam toward said valve with a force greater than said predetermined force, an adjustable abutment lug slidably engaged with said cam to vary its axial movement upon rotation thereof, a supporting arm for said lug, a valve-operating lever pivotally supported in the casing and straddling said arm, high and low fire stops for said lever mounted on the casing and on said arm, said valve-operating lever having one arm abutting with said valve and a second arm overlying said supporting arm, and a thermally operated element on the casing and cooperable with said second arm to move said valve toward closed position from the open position as determined by the setting of said cam.

8. A control device of the character described comprising a casing having a liquid supply chamber provided with an outlet, a metering valve for regulating flow through said outlet, spring means for biasing the valve toward open position with a predetermined force, a rotatably and axially movable cam having means abutting with the valve whereby the valve will assume a position with respect to its seat depending on the position to which said cam is rotated, a spring associated with said cam and urging said cam toward said valve with a force greater than said predetermined force, an adjustable abutment lug slidably engaged with said cam to vary its axial movement upon rotation thereof, a valve-operating lever pivotally supported in said casing and having an arm also abutting with said valve, a bimetallic leaf and electric heating element on said casing and cooperable with said lever to move said valve toward closed position from open position as determined by the setting of said cam, and manually operable means effective in one position to hold said leaf out of controlling relation to said lever.

ROY W. JOHNSON.